(12) United States Patent
Russ et al.

(10) Patent No.: US 8,386,963 B2
(45) Date of Patent: Feb. 26, 2013

(54) VIRTUAL INKING USING GESTURE RECOGNITION

(75) Inventors: V. Kevin Russ, Bellevue, WA (US); Ian M. Sands, Seattle, WA (US); John A. Snavely, Seattle, WA (US); Edwin Russ Burtner, Everett, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 12/474,212

(22) Filed: May 28, 2009

(65) Prior Publication Data

US 2010/0306649 A1 Dec. 2, 2010

(51) Int. Cl.
- G06F 3/01 (2006.01)
- G06F 3/033 (2006.01)
- G06F 3/14 (2006.01)

(52) U.S. Cl. .................. 715/863; 715/702; 715/864

(58) Field of Classification Search .................. 715/702, 715/863, 864
See application file for complete search history.

(56) References Cited

U.S. PATENT DOCUMENTS

| 7,234,119 B2 | 6/2007 | Wu et al. ............. 715/864 |
| 7,305,630 B2 | 12/2007 | Hullender et al. ......... 715/863 |
| 2004/0240739 A1 | 12/2004 | Chang et al. ............. 382/186 |
| 2005/0103536 A1* | 5/2005 | Seytter ................. 178/18.01 |
| 2008/0005703 A1* | 1/2008 | Radivojevic et al. ........ 715/863 |
| 2008/0117168 A1 | 5/2008 | Liu et al. ............... 345/158 |
| 2008/0168403 A1* | 7/2008 | Westerman et al. ......... 715/863 |
| 2008/0244468 A1* | 10/2008 | Nishihara et al. .......... 715/863 |

FOREIGN PATENT DOCUMENTS

WO WO0065530 11/2000

OTHER PUBLICATIONS

Lenman, et al.; "*Using Marking Menus to Develop Command Sets for Computer Vision Based Hand Gesture Interfaces*"; Proceedings of the Second Nordic Conference on Human-Computer Interaction; 2002; 8 Pgs.
Bowman, et al.; "*Pinch Keyboard: Natural Text Input for Immersive Virtual Environments*"; Dept. of Computer Science, Virginia Tech; 2 Pgs, 2000.
Poupyrev, et al; "*Virtual Notepad: Handwriting in Immersive VR*"; Proceedings of VRAIS'98, Mar. 1998; 7 Pgs.
Intelligent Earth; "*Magic Pen*"; http://www.intelligent-earth.com/products/products_magic_pen.php; 2 pgs, Jan. 30, 2009.

* cited by examiner

*Primary Examiner* — Weilun Lo
*Assistant Examiner* — Truc Chuong
(74) *Attorney, Agent, or Firm* — Merchant & Gould

(57) ABSTRACT

A virtual inking device is created in response to a touch input device detecting a user's inking gesture. For example, when a user places one of their hands in a pen gesture (i.e. by connecting the index finger with the thumb while holding the other fingers near the palm), the user may perform inking operations. When the user changes the pen gesture to an erase gesture (i.e. making a fist) then the virtual pen may become a virtual eraser. Other inking gestures may also be utilized.

17 Claims, 4 Drawing Sheets

VIRTUAL INKING USING GESTURE RECOGNITION

BACKGROUND

Computer display devices have been configured to function both as an input device and as a video output device. For example, computer display devices can be configured with touch surface mechanisms that allow users to enter user input data through a display surface. Sensors can detect when one or more objects contact a particular location on the display surface. A computer system can then perform some action in response to detecting the contact. For example, in response to detecting contact between an object and a display surface at a location corresponding to user-interface control, a computer system can perform some action associated with the user-interface control.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A virtual inking device is created in response to a touch input device detecting a user's inking gesture. For example, when a user places one of their hands in a pen gesture (i.e. by connecting the index finger with the thumb while holding the other fingers near the palm), the user may perform inking operations. When the user changes the pen gesture to an erase gesture (i.e. making a first) then the virtual pen may become a virtual eraser. Other inking gestures as well as other functionality may be associated with the virtual inking device.

DETAILED DESCRIPTION

Figure 1:
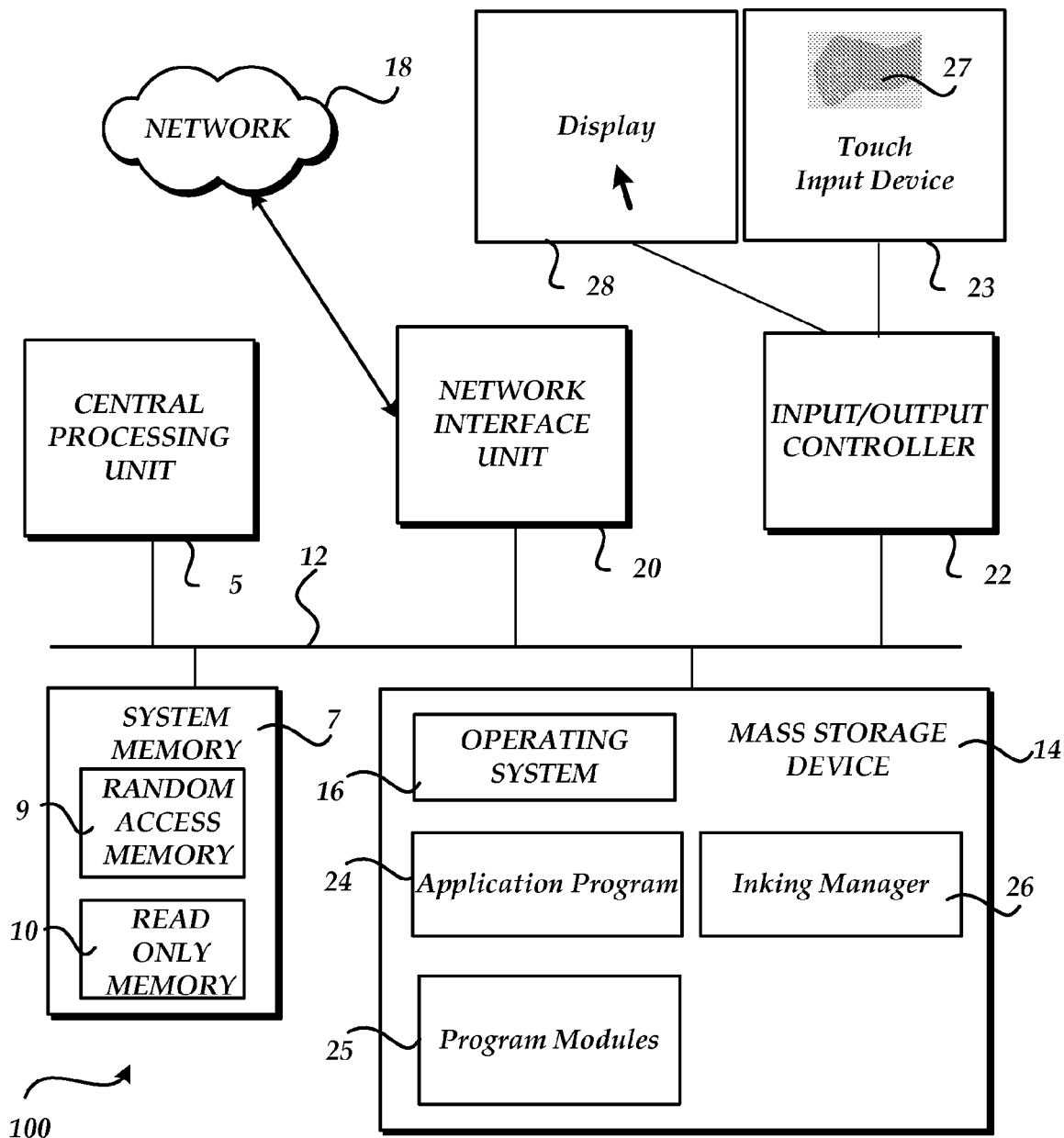
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program(s) 24, and other program modules 25, and inking manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Figure 2:
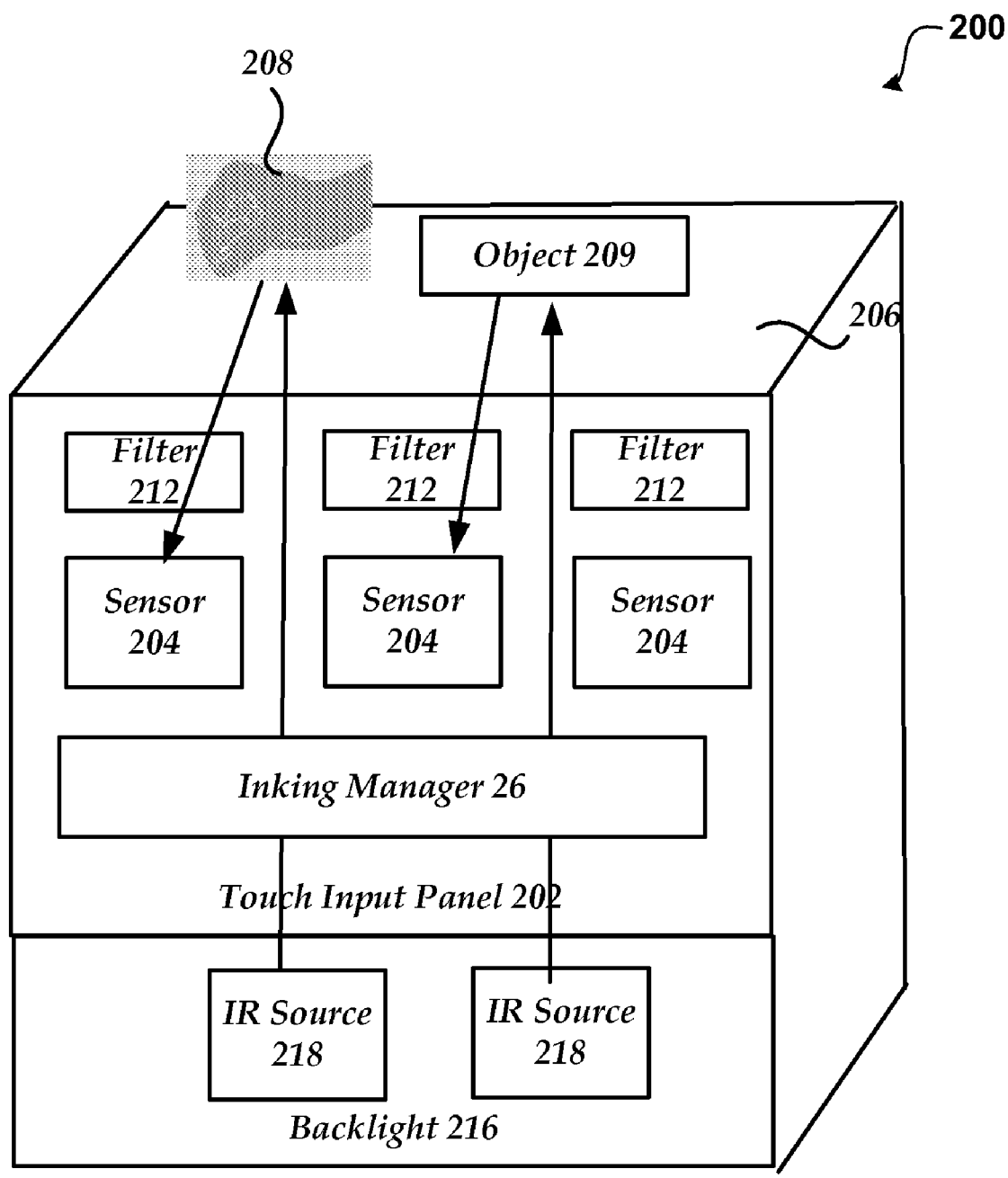
FIG. 2 illustrates an exemplary touch input system.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a touch input device 23. The touch input device may utilize any technology that allows more than one touch input to be recognized at a time. For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. An exemplary touch input device is shown in FIG. 2. The touch input device 23 may also act as a display. The input/output controller 22 may also provide output to one or more display screens, such as display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS® VISTA® or WINDOWS® 7® operating system from MICROSOFT CORPO- RATION of Redmond, Wash. According to one embodiment, the operating system is configured to include support for touch input device 23. According to another embodiment, a inking manager 26 may be utilized to process some/all of the touch input that is received from touch input device 23.

The mass storage device 14 and RAM 9 may also store one or more program modules. In particular, the mass storage device 14 and the RAM 9 may store one or more application programs 24. In conjunction with the operation of the application, inking manager 26 provides a virtual inking device that is created in response to an inking gesture being detected by touch input device 23. Generally, inking manager 26 is configured to create a virtual inking device in response to a user's placing of their hand in a specific gesture, such as a pen gesture or an erase gesture, near the surface of the touch input device 23. Different types of virtual inking devices may be created. For example, a virtual pen input device may be created in response to pen gesture 27. According to one embodiment, the pen gesture is recognized by inking manager 26 when the tip of the index finger touches the tip of the thumb while the other fingers remain at least slightly folded toward the palm. An erase gesture may be recognized by inking manager 26 when a user places their hand in a first. According to another embodiment, the user may place their hand in a flat orientation (fingers extended) above a location in order to activate the virtual erase input device. Once the virtual input device is created, the user may enter input through the created device on the input screen to interact with functionality that is provided by application 24. The virtual inking device 27 is removed when the gesture is no longer detected. The virtual input device 27 may also be associated with a location and interaction of an inking representation on another display. For example, when the user moves their gestured hand on/above touch input device 23, the representation of the inking device on display screen 28 also moves. Additional details regarding the virtual input devices will be provided below.

FIG. 2 illustrates an exemplary touch input system. Touch input system 200 as illustrated comprises a touch panel 202 that has several sensors 204 integrated therein. According to one embodiment, the sensors 204 are Infrared (IR) sensors. Objects that are in contact with or are above a touchable surface 206 include a gestured hand 208 that is close to but not in actual contact with touchable surface 206 and an object 209 that is touching touchable surface 206. Object 209 may be another hand and/or some other physical object. Infrared sensors 204 are distributed throughout touch panel 202 and are disposed parallel to touchable surface 206. One or more of the infrared sensors 204 may detect infrared radiation reflected from the objects 208 and 209, as indicated by the arrows. Although the term "above" is used in this description, it should be understood that the orientation of the touch panel system is irrelevant. As shown in FIG. 2, touchable surface 206 is horizontal, but in a different embodiment generated by rotating system 200 clockwise by 90 degrees, touchable surface 206 could be vertical. In that embodiment, the objects from which reflected IR radiation is detected are to the side of touchable surface 206. The term "above" is intended to be applicable to all such orientations.

Touch input panel 202 may comprise filters 212 that absorbs visible light and transmits infrared radiation and are located between touchable surface 206 and IR sensors 204 in order to shield IR sensors 204 from visible light incident on touchable surface 206 in the case where IR sensors 204 are sensitive to a broader range of wavelengths of light other than purely infrared wavelengths.

Touch input panel 202 may comprise a display that is configured to display images that are viewable via touchable surface 206. For example, the displayed image may be images relating to an application and/or a display of the inking that is created in response to a user's pen gesture being detected and moved near touchable surface 206. The display may be, for example, an LCD, an organic light emitting diode (OLED) display, a flexible display such as electronic paper, or any other suitable display in which an IR sensor can be integrated.

System 200 may comprise a backlight 216 for the display. Backlight 216 may comprise at least one IR source 218 that is configured to illuminate objects in contact with or adjacent to touchable surface 206 with infrared radiation through touchable surface 206, as indicated by the arrows. IR sensor 204s are sensitive to radiation incident from above, so IR radiation traveling directly from backlight 216 to IR sensor 204s is not detected.

The output of sensors 204 may be processed by inking manager 26 and/or functionality included within an operating system or some other application to detect when a physical object (e.g., a hand, a bottle, a glass, a finger, a hat, etc.) has come into physical contact with a portion of the touch input surface 206 and/or a physical object is in close proximity to the surface. For example, sensors 204 can detect when a portion of hand 208 is gestured and has come in contact and/or is near touch surface 206. Additional sensors can be embedded in the touch input display surface 206 and can include for example, pressure sensors, temperature sensors, image scanners, barcode scanners, etc., to detect multiple simultaneous inputs.

When the sensors 204 are IR sensors, the IR radiation reflected from the objects may be reflected from a user's hands, fingers, reflective ink patterns on the objects, metal designs on the objects or any other suitable reflector. Fingers reflect enough of the near IR to detect that a finger or hand is located at a particular location on or adjacent the touchable surface. A higher resolution of IR sensors may be used to scan objects in order to achieve higher resolution.

Sensors 204 can be included (e.g., embedded) in a plurality of locations. The density of sensors 204 can be sufficient such that contact across the entirety of touch input surface 206 can be detected. Sensors 204 are configured to sample the surface of touch input display surface 206 at specified intervals, such as, for example, 1 ms, 5 ms, etc. for detected contact and/or near contact. The sensor data received from sensors 204 changes between sampling intervals as detected objects move on the touch surface; detected objects are no longer within range of detection; and when new object come in range of detection. For example, inking manager 26 can determine when pen gesture 208 moves from one location on surface 206 to other locations on surface 206. In response to the movement, inking may be displayed on surface 206 and/or some other display. When the hand is gestured in an erase gesture, inking may be erased as the hand that is formed in the erase gesture is moved over inking. Upon receiving an indication that the gestured hand is no longer detected, the virtual inking is deactivated.

FIG. 2 provides just one example of a touch input system. In other exemplary touch systems, the backlight may not comprise any IR sources and the surface 206 may include a frontlight which comprises at least one IR source. In such an example, the touchable surface 206 of the system is a surface of the frontlight. The frontlight may comprise a light guide, so that IR radiation emitted from IR source travels through the light guide and is directed towards touchable surface and any objects in contact with or adjacent to it. In other touch panel systems, both the backlight and frontlight may comprise IR sources. In yet other touch panel systems, there is no backlight and the frontlight comprises both IR sources and visible light sources. In further examples, the system may not comprise a frontlight or a backlight, but instead the IR sources may be integrated within the touch panel. In an implementation, the touch input system 200 may comprise an OLED display which comprises IR OLED emitters and IR-sensitive organic photosensors (which may comprise reverse-biased OLEDs). In some touch systems, a display may not be included. Even if the touch system comprises one or more components or elements of a display, the touch system may be configured to not display images. For example, this may be the case when the touch input tablet is separate from a display. Other examples include a touchpad, a gesture pad, and similar non-display devices and components.

For some applications, it may be desirable to detect an object only if it is in actual contact with the touchable surface of the touch panel system. The IR source of the touch input system may be turned on only if the touchable surface is touched. Alternatively, the IR source may be turned on regardless of whether the touchable surface is touched, and detection of whether actual contact between the touchable surface and the object occurred is processed along with the output of the IR sensor. Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Figure 3:
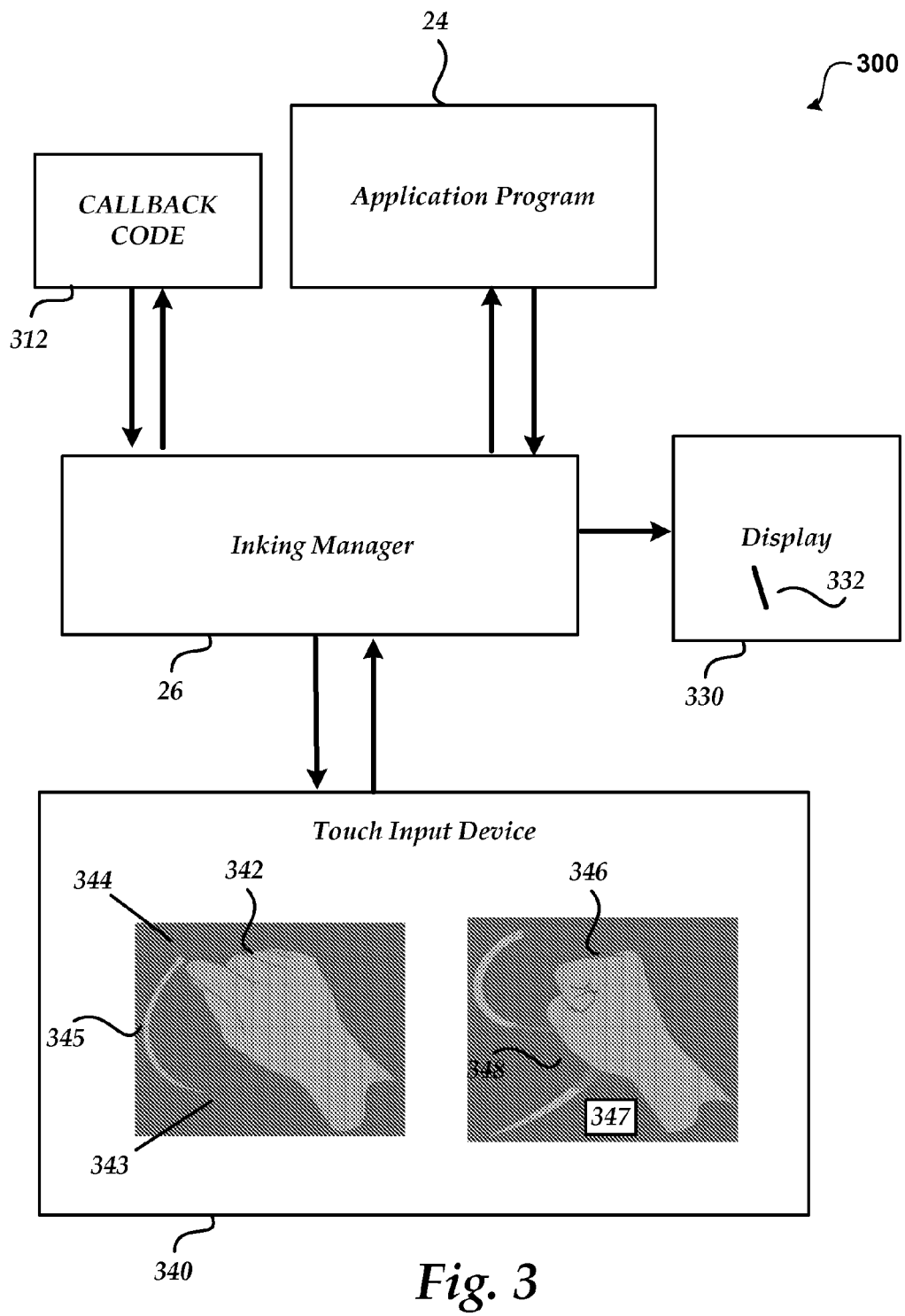
FIG. 3 shows a system for creating a virtual inking device in response to a hand being placed into an inking gesture.

FIG. 3 shows a system 300 for creating a virtual inking device in response to a hand being placed into an inking gesture. As illustrated, system 300 includes application program 24, callback code 312, inking manager 26, display 330, and touch input device 340.

In order to facilitate communication with the inking manager 26, one or more callback routines, illustrated in FIG. 3 as callback code 312 may be implemented. According to one embodiment, application program 24 is configured to receive inking input from a touch-sensitive input device 340. For example, inking manager 26 may provide an indication to application 24 that an inking device is being utilized as well as a current location of the inking device.

According to one embodiment, a virtual inking device is active when a user places their hand in a specific inking gesture above the touch sensitive input device 340. The inking action of the virtual inking device may be shown directly on the input device 340 and/or on a separate display. Additionally, when a user moves their hand that is placed in the inking gesture; a pen device 332 may move in response to the movement of the gestured hand above the touch screen. Similarly, when the user taps their gestured hand on the touch surface some other action may be performed. For example, the gestured hand may act as a pointer that may select a menu option from application 24. In the current example, two different inking gestures are illustrated including pen gesture 342 and erase gesture 346. When the pen gestured hand moves from a start point 343 to an end point 344 an inking 345 is created. The inking may be shown on touch input device as well as one or more other displays such as display 330. When the erase gestured hand 346 moves over an inking, a portion 348 of the inking is erased. Other inking gestures besides a pen gesture and an erase gesture may be utilized in accordance with other embodiments. For example, an inking gesture may be defined to highlight text; create a paintbrush, and the like. According to an embodiment of the invention, the gestured hand is placed above the surface of the touch input device. According to another embodiment, the gestured hand may be placed on the surface. According to yet another embodiment, a combination of the gestured hand being placed on the surface as well as above the surface may be utilized. Additionally, one or more menu options 347 may be provided near a user's gestured hand. The menu options 347 may be configured to perform any type of function. For example, menu options 347 may include various inking options, such as pen color, pen width, eraser width, and the like.

As opposed to a hardware input device, the virtual inking device is only activated when a user places their hand in a specific inking gesture near/on the touch surface. In this way, the inking device is hidden when not needed by a user. Additionally, using a virtual inking device allows a user to keep their hands on the touch surface without having to reach for a hardware inking device, such as a stylus.

Figure 4:
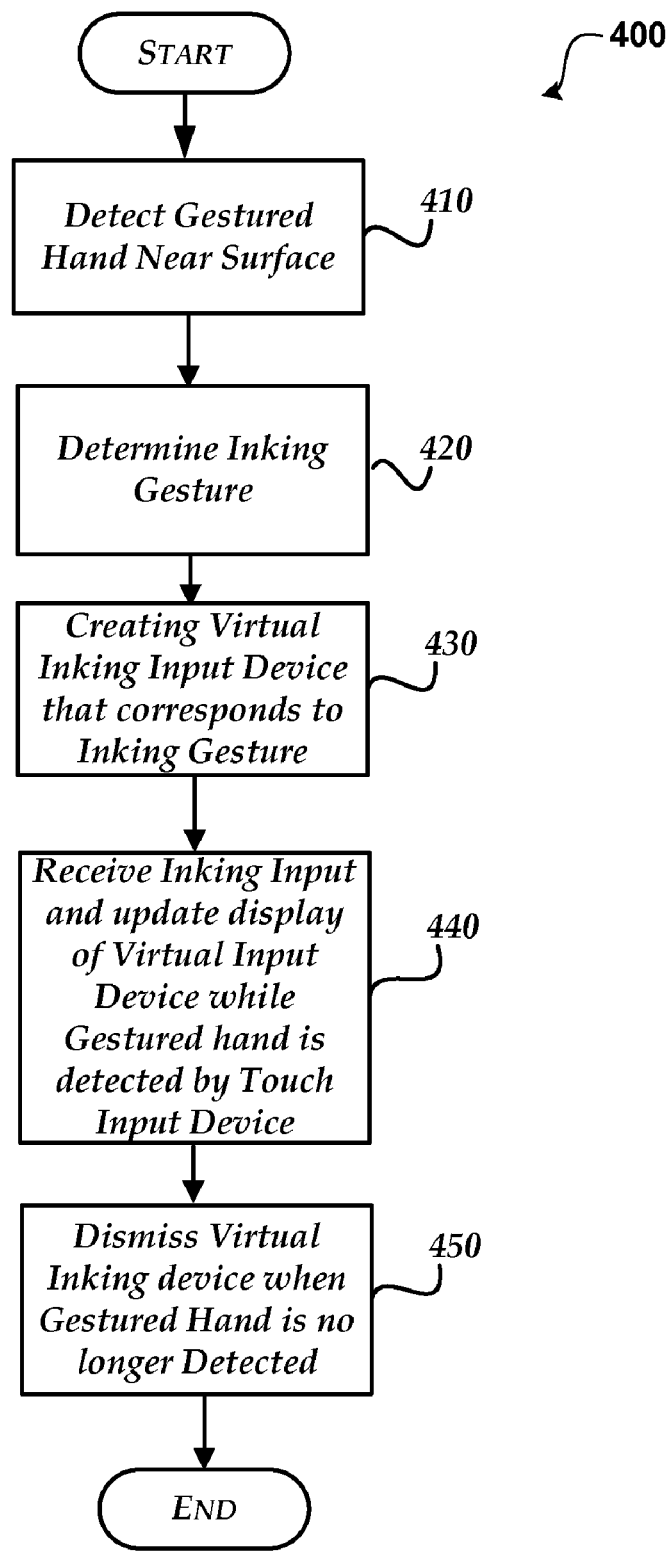
FIG. 4 shows an illustrative process for creating a virtual inking device.

Referring now to FIG. 4, an illustrative process 400 for creating a virtual inking device will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 410, where a gestured hand is detected. According to one embodiment, a gestured hand is detected when the hand is near the surface of the touch input device. The gestured hand may be detected by gesturing functionality that is included within an operating system and/or some other program code, such as an inking manager.

Moving to operation 420, the type of inking gesture is determined. According to one embodiment, a pen gesture is determined when the tip of the index finger touches the tip of the thumb while the other fingers remain at least slightly folded. According to other embodiments, a pen gesture may be defined as any hand gesture that represents holding a pen. An erase gesture may be determined when a user places their hand in a first. According to another embodiment, the user may place their hand in a flat orientation (fingers extended) above a location in order to activate the virtual erase input device. More inking gestures may be defined and recognized. For example, a paint brush gesture, a spray can gesture, or other gestures used in inking may be defined and utilized. The defined gestures may be recognized by the inking manager and/or some other program that is defined to recognize gestures.

Flowing to operation 430, the virtual inking device representing the gestured hand is created. For example, the virtual inking device created may be a pen inking device or an erasing inking device. According to one embodiment, a graphical representation of the inking device may be displayed on one or more displays.

Moving to operation 440, the virtual inking device receives input from the user while the gestured hand is detected by the touch input device. For example, a user may move their gestured hand across the touch surface in order to create ink or erase a portion of the ink.

Flowing to operation 450, the virtual inking device is removed when the user's gestured hand is no longer detected by the touch input device.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for creating a virtual inking device, comprising:
    determining when a hand is detected by a touch input device that is configured to receive multiple touches at a same time;
    determining when the hand is gestured in a form of an inking gesture comprising a pen gesture that as long as activated inking is displayed in response to movement and an erase gesture that as long as activated erases content from the display in response to movement;
    wherein determining the pen gesture comprises determining when a tip of an index finger of the hand touches a tip of a thumb of the hand while other fingers of the hand are folded at each knuckle;
    in response to determining that the gestured hand is in the form of the inking gesture, creating the virtual inking device that is used to perform inking operations that is associated with an application;
    receiving inking input from the virtual inking device by determining movement of the gestured hand in relation to a surface of the touch input device; and performing an inking operation that corresponds to the inking gesture that comprises affecting content displayed; and
    displaying inking on the touch input device without a display of a graphical pen and displaying the inking on a separate display screen with a display of the graphical pen that is a graphical representation of the virtual inking device.

2. The method of claim 1, wherein the inking gesture consists of a pen gesture and an erase gesture and as long as the inking gesture is maintained the corresponding inking action or erasing action is performed in response to movement.

3. The method of claim 1, wherein determining when the hand is gestured in the form of an inking gesture comprises determining the inking gesture is an erase gesture when the hand is placed into a fist.

4. The method of claim 3, wherein determining when the hand is detected by a touch input device comprises determining when the hand is near, but not touching, the surface of the touch input device.

5. The method of claim 4, wherein creating the virtual inking device comprises creating a virtual menu option that is displayed near the hand while the hand remains in the form of the inking gesture.

6. The method of claim 5, wherein the virtual menu option includes menu items relating to changing settings of the inking device.

7. The method of claim 6, further comprising determining when the gestured hand becomes undetected and when the gestured hand becomes undetected disabling the virtual inking device.

8. The method of claim 1, wherein movement of the hand that is placed into the form of an inking gesture moves a display of an inking device that is shown on a separate display screen from the touch input device where the inking gesture is received.

9. A computer-readable storage medium having computer-executable instructions for creating a virtual inking device, comprising:
    determining when a gestured hand is detected by and is placed above a surface of a touch input device that is configured to receive multiple touches at a same time;
    determining when the gestured hand is in a form of any one of: a pen gesture, an erase gesture, a highlight gesture and a create a paintbrush gesture, wherein determining when the gestured hand is in the form of the pen gesture comprises determining when a tip of an index finger of the hand touches a tip of a thumb of the hand while other fingers of the hand remain folded near a palm of the hand;
    in response to determining that the gestured hand is in the form of the pen gesture, creating a virtual pen device that is used to perform inking operations that is associated with an application as long as the gestured hand is maintained;
    in response to determining that the gestured hand is in the form of the erase gesture, creating a virtual erasing device that is used to erase ink that is associated with the application as long as the gestured hand is maintained;
    displaying a graphical representation of the virtual device;
    receiving inking input from the created virtual device by determining movement of the gestured hand in relation to the surface of the touch input device; and performing the inking operation that corresponds to the determined inking gesture; and
    displaying the inking relating to the pen gesture on the touch input device without a display of a graphical pen and displaying the inking relating to the pen gesture with a display of the graphical pen that is a graphical representation of the virtual inking device when an additional display is used to show the inking in addition to the touch input device.

10. The computer-readable storage medium of claim 9, wherein determining when the gestured hand is in the form of the erase gesture when the hand is placed into a fist.

11. The computer-readable storage medium of claim 9, wherein movement of the gestured hand moves a display of an inking device on a separate display screen from the touch input device.

12. The computer-readable storage medium of claim 9, wherein creating the virtual inking device comprises creating a virtual menu option that is displayed near the gestured hand while the hand remains in the form of the inking gesture.

13. The computer-readable storage medium of claim 12, wherein the virtual menu option includes menu items relating to changing settings of the inking device including pen color, pen width, and pen type.

14. The computer-readable storage medium of claim 13, further comprising determining when the gestured hand becomes undetected and when the gestured hand becomes undetected disabling the virtual inking device.

15. A system for utilizing a virtual input device created in response to touch inputs, comprising:
    a touch surface that is configured to receive multiple touches;
    a processor and a computer-readable medium;
    an operating environment stored on the computer-readable medium and executing on the processor; and
    am inking manager operating under the control of the operating environment and operative to:

determining when a gestured hand is detected by and is placed near a surface of a touch input device that is configured to receive multiple touches at a same time;

determining when the gestured hand is in a form of either a pen gesture or an erase gesture, wherein determining when the gestured hand is in the form of the pen gesture comprises determining when a tip of an index finger of the hand touches a tip of a thumb of the hand while other fingers of the hand remain folded near a palm of the hand;

in response to determining that the gestured hand is in the form of the pen gesture, creating a virtual pen device that is used to perform inking operations that is associated with an application as long as the gestured hand is maintained;

displaying a graphical representation of the virtual pen device;

in response to determining that the gestured hand is in the form of the erase gesture, creating a virtual erasing device that is used to erase ink that is associated with the application as long as the gestured hand is maintained;

receiving inking input from the created virtual device by determining movement of the gestured hand in relation to the surface of the touch input device; and performing the inking operation that corresponds to the determined inking gesture; and displaying the inking relating to the pen gesture on the touch input device without a display of a graphical pen and displaying the inking relating to the pen gesture with a display of the graphical pen that is a graphical representation of the virtual inking device when an additional display is used to show the inking in addition to the touch input device.

16. The system of claim 15, wherein determining when the gestured hand is in the form of the erase gesture when the hand is placed into a fist.

17. The system of claim 16, further comprising creating a virtual menu option that is displayed near the gestured hand while the hand remains in the form of the inking gesture, and wherein the virtual menu option includes menu items relating to changing settings of the inking device including pen color, pen width, and pen type.

* * * * *